United States Patent
Hajianpour

(12)
(10) Patent No.: US 6,502,953 B2
(45) Date of Patent: Jan. 7, 2003

(54) FLOATING LIGHT FOR A SWIMMING POOL

(76) Inventor: Mohammed Ali Hajianpour, 1706 Vistal Dr., Coral Springs, FL (US) 33071

( * ) Notice: Subject to any disclaimer, the term of this patent is extended or adjusted under 35 U.S.C. 154(b) by 7 days.

(21) Appl. No.: 09/794,203

(22) Filed: Feb. 27, 2001

(65) Prior Publication Data

US 2002/0085392 A1 Jul. 4, 2002

Related U.S. Application Data

(60) Provisional application No. 60/258,793, filed on Dec. 29, 2000, and provisional application No. 60/258,795, filed on Dec. 29, 2000.

(51) Int. Cl.[7] .................................................. F21L 4/02
(52) U.S. Cl. ....................................... 362/186; 362/101
(58) Field of Search ................................ 362/101, 186, 362/562

(56) References Cited

U.S. PATENT DOCUMENTS

| | | | | |
|---|---|---|---|---|
| 3,748,457 A | * | 7/1973 | Balitzky et al. ............. | 362/158 |
| 4,088,880 A | | 5/1978 | Walsh ......................... | 362/96 |
| 4,261,026 A | * | 4/1981 | Bolha ............................. | 43/17 |
| 4,521,839 A | | 6/1985 | Cook et al. .................. | 362/238 |
| 4,665,470 A | | 5/1987 | George, Jr. .................. | 362/236 |
| 4,779,174 A | | 10/1988 | Staten et al. ................ | 362/158 |
| 4,851,972 A | | 7/1989 | Altman ........................ | 362/267 |
| 4,999,755 A | | 3/1991 | Lin ............................. | 362/250 |
| 5,105,343 A | * | 4/1992 | Wakimoto ................... | 315/291 |
| 5,337,225 A | | 8/1994 | Brookman ................... | 362/145 |
| 5,351,432 A | * | 10/1994 | Tse .................................. | 43/17 |
| 5,927,845 A | | 7/1999 | Gustafson et al. .......... | 362/152 |
| 5,934,796 A | | 8/1999 | Quereau ...................... | 362/318 |
| 6,220,718 B1 | * | 4/2001 | Burgess ....................... | 315/291 |

* cited by examiner

Primary Examiner—Sandra O'Shea
Assistant Examiner—Ismael Negron
(74) Attorney, Agent, or Firm—Ronald V. Davidge

(57) ABSTRACT

A floating light includes a lower base section, in which a battery holder is mounted, an electrically-driven light source, and an upper housing including an illuminated portion transmitting light. In one version, the upper housing is a translucent hemisphere, and the lower base portion includes a hemispherical internal reflector. In another version, the upper housing includes flexible transparent tubes in which LEDs are illuminated. In yet another version, upper housing includes optical fibers illuminated by a bulb. A plug filling an outer hole in the lower base section is preferably movable to turn the light on and off and removable to provide for battery replacement.

27 Claims, 5 Drawing Sheets

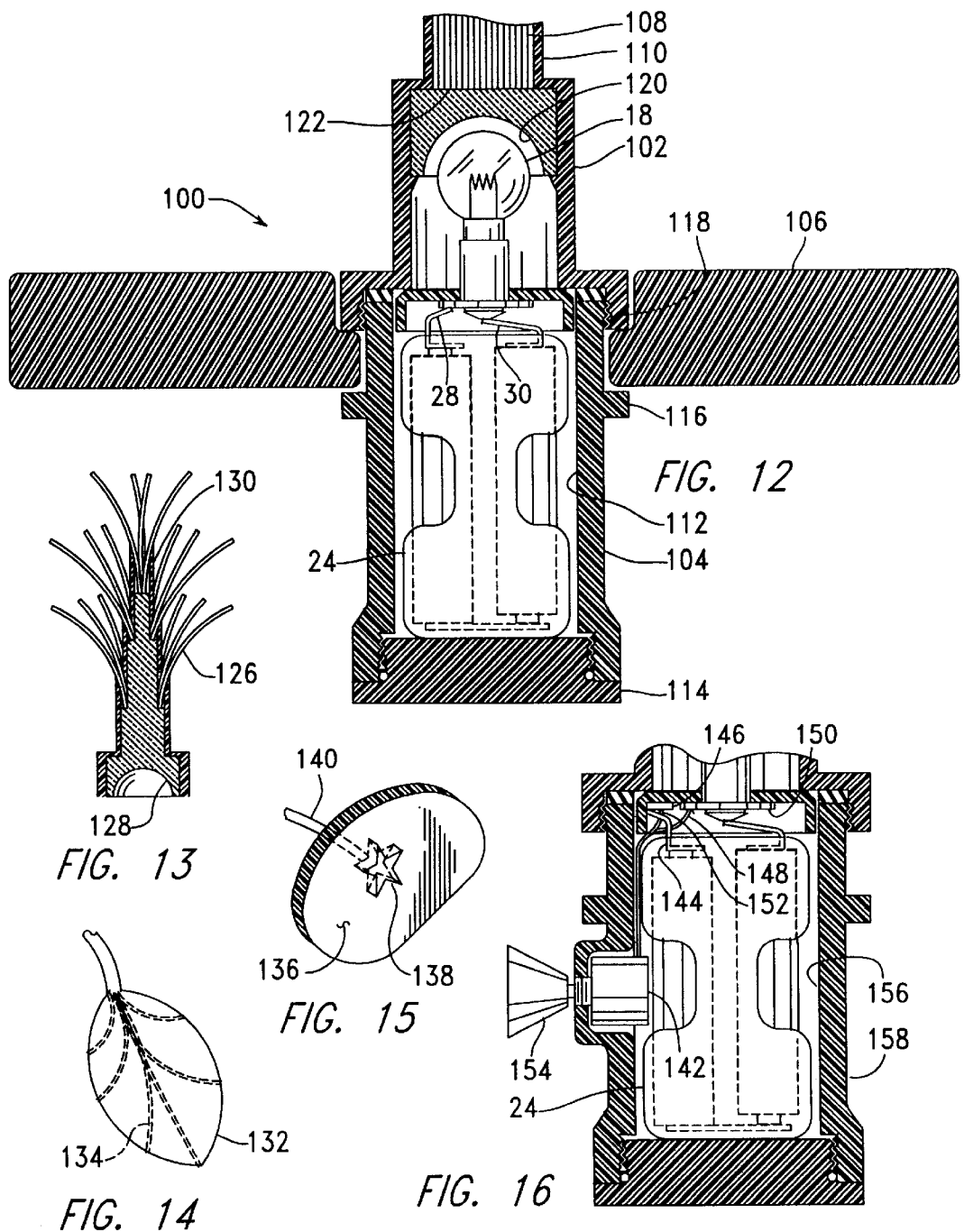

FLOATING LIGHT FOR A SWIMMING POOL

This application claims the benefits of Provisional Applications Nos. 60/258,793 and 60/258,795, both of which were filed on Dec. 29, 2000.

BACKGROUND OF THE INVENTION

1. Field of the Invention

This invention relates to a battery-power floating light for decorative use in a swimming pool or fountain.

2. Background Art

Several U.S. Patents describe battery-powered devices for providing underwater light in swimming pools. For example, U.S. Pat. No. 3,758,457 describes a battery-operated safety light for swimming pools, in the form of a circular and floatable disc-like structure having on its interior a plurality of batteries which are enclosed in a watertight compartment thereof. A bulb extends downward from a reflector at the lower portion of the device within a waterproof globe to illuminate the water within the pool at night.

Another underwater light is described in U.S. Pat. No. 5,934,796 including an upper structure having a downward-directed hemispherical surface covered with a number of mirror segments. A base unit, mounted on a segmented shaft extending downward from the center of the upper structure, includes a number of battery-powered lights directed upward toward the hemispherical surface. Preferably, the upper structure is driven by a motor to rotate about the shaft relative to the base unit, so that a moving pattern of lights is created on the pool walls and bottom. The apparatus may float with the upper structure on the surface of the water, or the base unit may be placed on the bottom of the pool.

U.S. Pat. No. 4,779,174 describes a flat disk-shaped battery-powered light, which can be submerged, and left on the bottom of a swimming area, for used as a point of orientation for people swimming underwater at night.

U.S. Pat. No. 4,088,880 describes a decorative fountain especially adapted for use in a swimming pool, the fountain being adapted to float at the surface of the pool and incorporating a sealed beam light bulb for illumination of the fountain display, and further embodying a self-contained source of electrical current for the light bulb.

U.S. Pat. No. 5,351,432 describes a battery-powered, illuminated fishing float having a housing shaped as a gourd, with a tapered lower compartment including a battery, a tapered upper compartment including an LED (light-emitting-diode), which is on whenever the battery is operational, and an enlarged central section including a light bulb which is turned on by upward movement of a floating actuator. The float is fastened to a fishing line, so that the light bulb is turned on when the line is pulled downward by a fish.

A number of examples from the patent art, including U.S. Pat. Nos. 4,999,755 and 4,665,470, describe tubular structures including plural light packages.

What is needed is a simple, yet attractive light for swimming pools or decorative pools to provide a lighted surface extending upward from the water, which can furthermore be easily turned on and off without the expense of a waterproof switch assembly.

SUMMARY OF THE INVENTION

In accordance with one aspect of the invention, a floating light is provided, which includes upper and lower housing sections, an electrically-driven light source, a battery housing, and a removable plug. The upper housing section includes an illuminated portion composed of a material transmitting light. The lower housing section includes a hollow central portion having an inner opening and an outer opening. The electrically-driven light source extends through the inner opening of the hollow central portion. The electrically-driven light source includes an illuminating portion extending within the upper housing section to illuminate the illuminated portion of the upper housing section and a base portion extending within the hollow central portion of the lower housing. The base portion includes first and second light source terminals electrically connected to drive the illuminating portion. The battery housing includes a battery structure and first and second contacts extending toward the light source terminals. The battery structure includes first and second battery terminals. A battery voltage is established between the first and second battery terminals. The first contact is electrically connected to the first battery terminal. The second contact is electrically connected to the second battery terminal. The battery housing is slidably mounted to move within the hollow central portion of the lower housing between first and second positions. The first contact is held against the first light source terminal and the second contact is held against the second light source terminal when the battery housing is held in the first portion. The first contact is separated from the first light source terminal when the battery housing is held within the second position. The battery housing is additionally removable through the outer opening in the hollow central portion of the lower housing section. The removable plug closes the outer opening in the hollow central portion of the lower housing section and holds the battery housing in the first and second positions. The floating light floats in water with a portion of the upper housing above a surface of the water and with a portion of the lower housing below the surface of the water.

In a first embodiment, the illuminated portion of the upper housing section includes a hemispherical section composed of a material transmitting light, and the lower housing includes an annular outer portion shaped as a hemisphere.

In a second embodiment, the floating light additionally includes a float extending around the lower housing section, the upper housing includes a light-transmitting tube, and the electrically-driven light source includes a pair of electrical conductors and a plurality of light-emitting elements connected to the pair of electrical conductors extending within the light-transmitting tube.

In a third embodiment, the floating light additionally includes a float extending around the lower housing section, and the upper housing includes a number of light transmitting fibers and a framework holding the plurality of light transmitting fibers in place.

BRIEF DESCRIPTION OF THE DRAWINGS

FIG. 12 is a vertical cross-sectional view of the floating light of FIG. 11, taken as indicated by section lines XII—XII in FIG. 11;

FIG. 13 is a fragmentary vertical cross-sectional view of a floating light built in accordance with an alternative version of the third embodiment of the invention;

FIG. 14 is a fragmentary perspective view of a floating light built in accordance with another alternative version of the third embodiment of the invention;

FIG. 15 is a fragmentary perspective view of a floating light built in accordance with yet another alternative version of the third embodiment of the invention; and FIG. 16 is a vertical cross-sectional view of a floating light built in accordance with the invention, showing the application therein of a separate power switch.

DETAILED DESCRIPTION OF THE INVENTION

Figure 1:
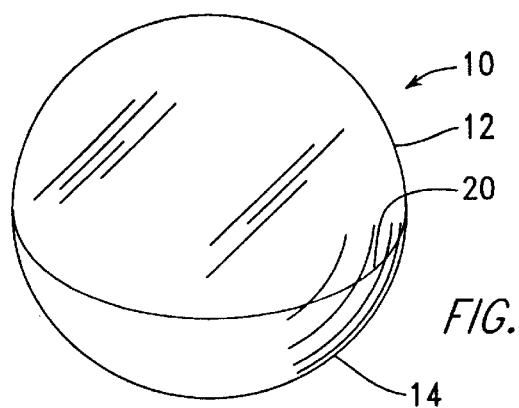
FIG. 1 is a perspective view of a floating light built in accordance with a first embodiment of the invention.
Figure 2:
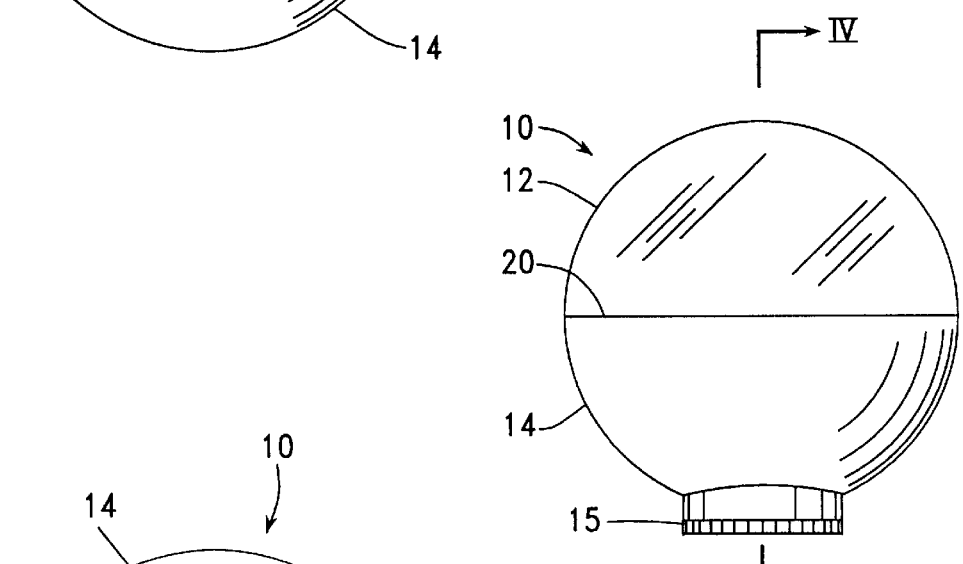
FIG. 2 is a side elevation of the floating light of FIG. 1.
Figure 3:
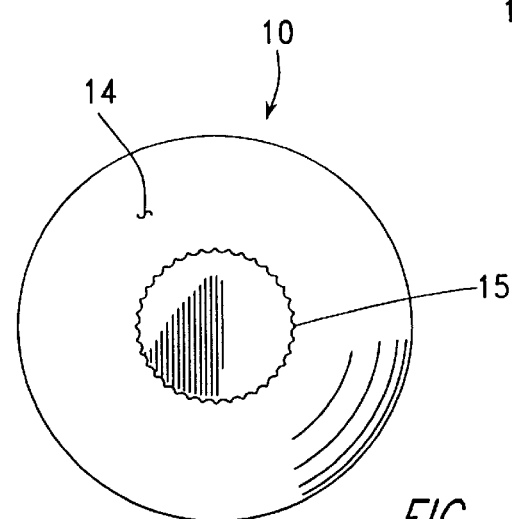
FIG. 3 is a bottom plan view of the floating light of FIG. 1.

FIGS. 1–3 are exterior views of a floating light 10 built in accordance with a first embodiment of the present invention, with FIG. 1 being a perspective view thereof, with FIG. 2 being a side elevation thereof, and with FIG. 3 being a bottom plan view thereof. This floating light 10, which includes an upper hemispherical housing section 12 and a lower base section 14, is particularly configured to float on the surface of a swimming pool or decorative pool with a light emanating through the upper hemispherical housing section 12, and with electrical energy for the light being provided through an internal battery box, which is held in place by a removable plug 15, additionally serving as a means for turning the light on and off.

Figure 4:
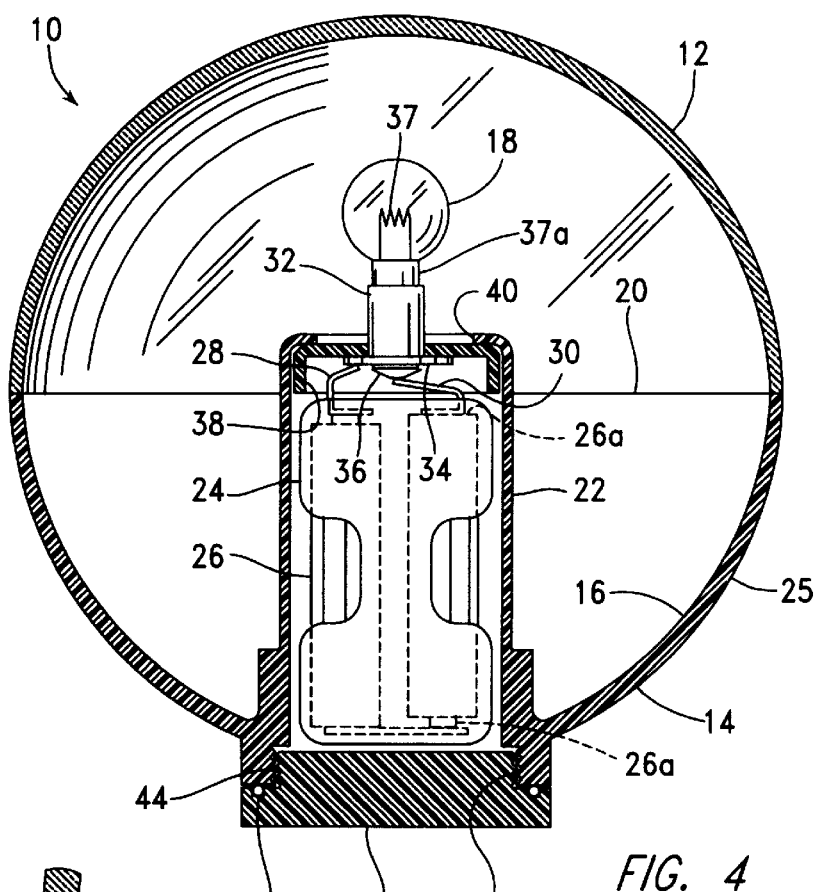
FIG. 4 is a vertical cross-sectional view of the floating light of FIG. 1, taken as indicated by section lines IV—IV in FIG. 2.

FIG. 4 is a vertical cross-sectional view of a light built in accordance with the present invention, taken in the direction of section lines IV—IV in FIG. 2. The upper hemispherical housing section 12 and the lower base section 14 may be similar or different in color and material properties.

Preferably, the upper hemispherical housing section 12 is composed in a manner providing for the transmission of light from the interior of the light 10 while preventing the viewing of a clear image of elements within the light 10. This effect may be achieved, for example, through molding a clear thermoplastic resin including a filler providing for internal reflections, thereby forming a translucent structure, or by molding a clear thermoplastic resin within a mold having a wall with a roughened pattern, producing a "frosted" effect. In this way, the surface of the upper hemispherical housing section 12 appears to glow when light is emitted within the floating light 10, as such light is both diffused and transmitted within the upper hemispherical housing section 12.

The lower base section 14 is preferably composed of a material having an internal surface 16 serving as a reflector for light emanating from an internal electric bulb 18. Variations in color may also be used to obtain certain visual effects. For example, the upper hemispherical housing section 12 may be optically transparent or translucent and red in color, while the base section 14 is opaque and white. Furthermore, the base section 14 may generally be of one color, with a white internal surface 16, being produced by painting or by molding differently colored resins.

Figure 5:
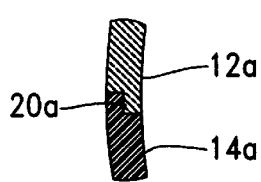
FIG. 5 is a fragmentary vertical cross-sectional view of the floating light of FIG. 1 showing a first alternative method for joining housing sections therein.
Figure 6:
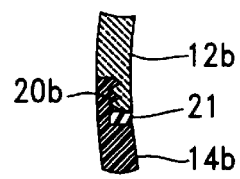
FIG. 6 is a fragmentary vertical cross-sectional view of the floating light of FIG. 1 showing a second alternative method for joining housing sections therein.

FIGS. 5 and 6 are fragmentary cross-sectional views showing alternative structures extending around a joint between the upper hemispherical housing section 12 and the lower base section 14. Preferably, these sections 12, 14 are permanently joined at a central seam by a process, such as solvent bonding, to form a watertight seal. The central seam may be flat, as the central seam 20 shown in FIG. 4, or stepped as an aid in alignment, as the central seam 20a in FIG. 5 shown extending between a first alternative upper hemispherical housing section 12a and a first alternative lower base section 14a. Alternately, as shown in FIG. 6, a second alternative upper hemispherical housing section 12b is mechanically fastened to a second alternative lower base section 14b with mating threaded surfaces 20b and with an elastomeric gasket 21 forming a watertight seal.

Continuing to refer to FIG. 4, the lower base section 14 includes a central portion 22 extending around a battery holder 24 and an annular hemispherical portion 25 extending around the central portion 22. Preferably, the upper hemispherical housing section 12 and the annular hemispherical portion 25 of the lower base section 14 have the same spherical radius, so that the floating light 10 is shaped as a sphere except in the area of the removable plug 15. The floating light 10 displaces enough water to float, preferably with all or most of the upper hemispherical housing section 12 exposed above the water. With the weight of the batteries 26, the center of gravity of the floating light 10 is below its center of buoyancy, so that the light 10 floats with the upper hemispherical housing section 12 directed upward. This shape provides a floating light 10 which will readily turn over from any orientation to the preferred orientation, even if the light is simply tossed into the center of a swimming pool.

In the example of FIG. 4, the battery holder 24 preferably holds four batteries 26, such as AA cells with conventional contacts within the battery holder 24 connecting conventional terminals 26a of the cells 26 in series, forming a voltage source extending between an outer contact terminal 28 and an inner contact terminal 30. In general, a number of batteries or cells within the battery holder 24 are wired together, in series, in parallel, or in some combination of series and parallel attachment, to form a battery structure having two terminals connected respectively to the contact terminals 28, 30. Alternately, the battery structure may be formed using a single battery or cell within the battery holder 24, with the single battery or cell having two terminals connected respectively to the contact terminals 28, 30.

The electric bulb 18 is mounted within a socket 32 including a conductive lower flange 34 through which a lower tip terminal 36 of the bulb 18 extends to contact the inner contact terminal 30. The electric bulb 18 is of a conventional incandescent type, having a filament 37 electrically connected between the lower tip terminal 36 of the bulb and a conductive housing 37a of the bulb. The socket 32 removably mounts the bulb 18 in a conventional manner, as with screw threads or with a quarter-turn arrangement, forming an electrical connection between the housing 37a of the bulb and the lower flange 34. The socket 32 is in turn mounted within a bulb holder 38, held within the central portion 22 of the lower base section 14 in a manner allowing the bulb 18 to extend upward through an inner opening 40 in the central portion 22.

The removable plug 15 has external screw threads 44 engaging internal screw threads of an outer opening 46 in the base 14. A gasket 48 forms a watertight seal, as the cap 42 is fully tightened, allowing the light 10 to be floated in a swimming pool or in a decorative pond. Tightening the cap 42 also brings the inner contact terminal 30 into contact with the lower tip 36 of the bulb 18 and brings the outer contact terminal 28 into contact with the flange 34 of the socket 32, so that the bulb is turned on. Loosening the cap 24 reverses this process, turning off the bulb 18. The electrical circuit driving the filament 37 with current from the batteries 26 is broken either when the inner contact terminal 30 pulls away from the lower tip terminal 36 of the bulb 18 or when the outer contact terminal 28 pulls away from the conductive flange 34 of the socket 32. Preferably, one of these contact terminals 28, 30 is flexible enough to hold the other of these contact terminals 28, 30 separated from its contact with the lower flange 34 or the lower tip terminal 36 after the circuit is broken.

When the cap 42 is completely removed, the battery holder 24 and the bulb holder 38 may be dropped out through the hole within threads 46 for replacement of the batteries 26 and of the bulb 18 and may subsequently be replaced within the central portion 22 through the outer opening 46.

Figure 7:
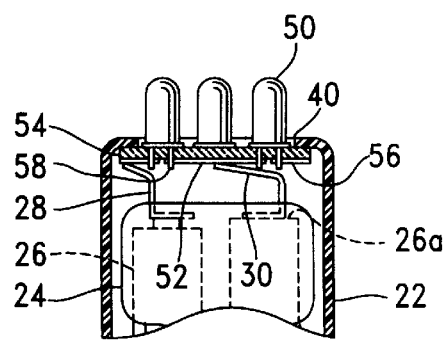
FIG. 7 is a fragmentary vertical cross-sectional view of the floating light of FIG. 1, showing an alternative light source included therein.

FIG. 7 is a fragmentary vertical cross-sectional view of the floating light 10, showing an alternate light source including a number of LEDs 50 electrically driven from the cells 26 in the battery holder 24. The inner contact terminal 30 is formed to provide electrical contact with an inner contact pad 52 extending centrally along a lower surface of a circuit board 54. In this way, electrical connections are established between the battery holder 24 and the circuit board 54, regardless of the angular position of the circuit board 54 within the cylindrical center portion 22. The outer contact terminal 28 is formed to provide electrical contact with an annular outer contact pad 56 extending around an outer portion of the lower surface of the circuit board 54. In the example of FIG. 7, the LEDs 50 are placed in a circular pattern on the circuit board 54, with the LEDs 50 extending upward through the inner opening 40 in the central portion 22 of the lower base section 14. The circuit board 54 preferably includes a number of plated through holes into which the individual leads 58 of the LEDs 50 are soldered.

Circuit paths extending along the circuit board 54 are established according to the requirements of the LEDs 50 and the capabilities of the battery cells 26. For example, one lead 58 of each LED 50 is electrically connected to the inner contact pad 52, while the other lead 58 is electrically connected to the outer contact pad 56, so that the LEDs 50 are wired in parallel between the contact terminals 28, 30 of the battery holder 24. Additional circuit elements, such as resistors (not shown) may be mounted either on the circuit board 54 or within the battery holder 24.

With the removable plug 15 (shown in FIG. 4) fully tightened, the contact terminals 28, 30 are held against the contact pads 52, 56. With the removable plug 15 partly loosened, electrical contact between one of the contact terminals 28, 30 and the associated contact pad is broken, turning off the LEDs 50, while continued contact between the other contact terminal and its associated contact pad holds the battery holder 24 downward, so that the LEDs are not turned on until the plug 15 is again tightened. When the plug 15 is entirely removed, the battery holder 24 can be removed for replacement of batteries 26, and the circuit board 54 can also be removed with its LEDs 50 for replacement.

Figure 8:
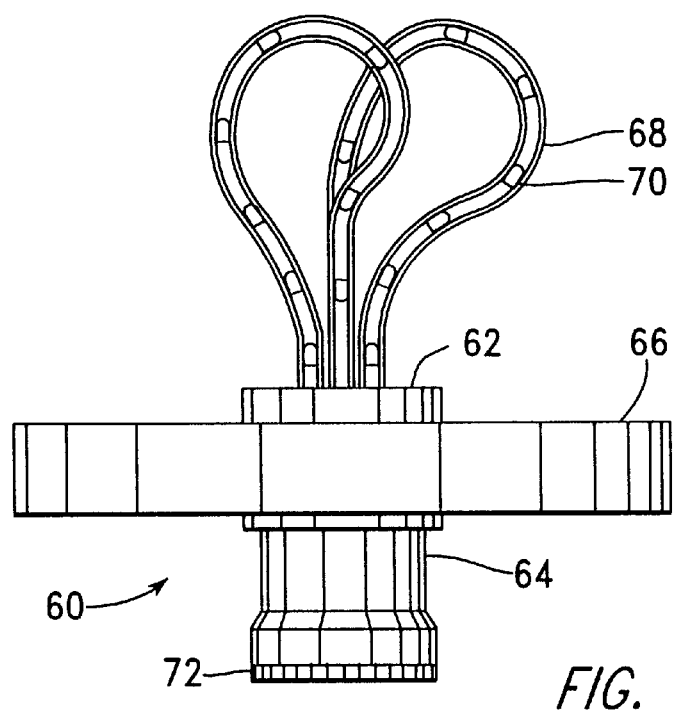
FIG. 8 is a side elevation of a floating light built in accordance with a second embodiment of the invention.
Figure 9:
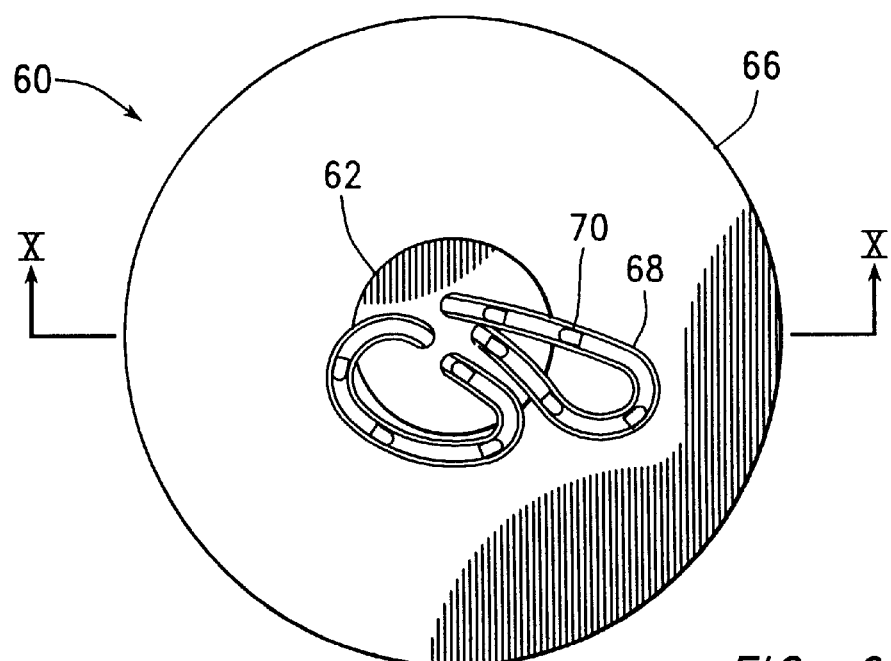
FIG. 9 is a plan view of the floating light of FIG. 8.

FIGS. 8 and 9 are external views of a floating light 60 built in accordance with a second embodiment of the invention, with FIG. 8 being a side elevation and FIG. 9 being a plan view. The floating light 60 includes an upper housing 62, a lower base section 64 and a float 66. The upper housing 62 in turn includes a pair of transparent tubes 68, each of which holds a string of LEDs 70. Turning a removable plug 72 at the bottom of the lower base section 64 turns the LEDs 70 on and off.

Figure 10:
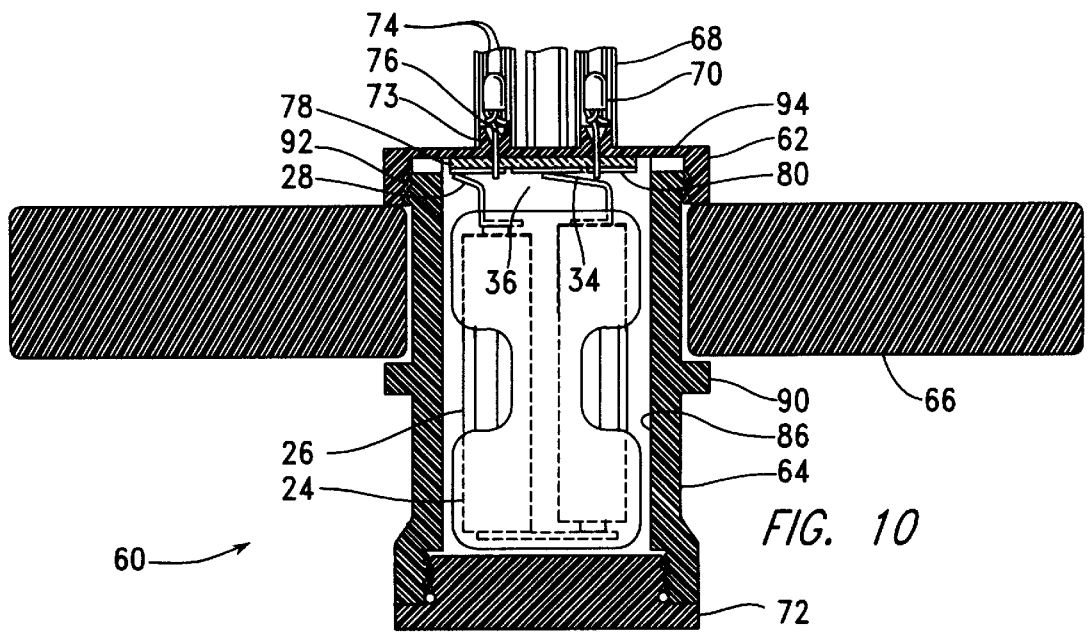
FIG. 10 is a vertical cross-sectional view of the floating light of FIG. 8, taken as indicated by section lines X—X in FIG. 8.

FIG. 10 is a vertical cross-sectional view of the floating light 60, taken as indicated by section lines X—X in FIG. 9. The upper housing 62 includes a number of upward-extending plugs 73, over which the opposite ends of each transparent tube 68 are installed, forming water-tight connections. Each tube 68 also holds a pair of conductors 74, to which the LEDs 70 within the tube 68 are electrically connected to form parallel connections. At each end of the tube 68, one of the conductors 74 extends downward through a funnel-shaped hole 76 in the plug 73 to be connected to a circuit path within a circuit board 78 extending within the upper housing. In this way, each of the conductors 74 within each tube 68 is electrically connected at the circuit board 78. Alternately, the LEDs 70 within each of the tubes 68 may be wired in series, again with a conductor extending from each end of the tube 68 for attachment within the circuit board 78.

Electrical connections between the battery holder 24 and the circuit board 78 are generally as described above in reference to FIG. 7, with a pair of flexible contacts 28, 30 being held against an annular outer contact pad 80 and a central circular contact pad 82, respectively, of the circuit board 78. Also as described above in reference to FIG. 7, rotation of a removable plug 72 is used both to turn the LEDs 70 on and off and to permit removal of the battery holder 24 for replacement of the cells 26, with the battery holder 24 being slidably mounted in a central hole 86 of the lower base section 64. (In this description, similar or identical elements within alternative embodiments are afforded like reference numerals.)

In the example of FIG. 10, a gasket ring 87 is shown as being compressed within an annular space between the plug 84 and the threaded outer opening 88 of the lower base section 64, instead of as being compressed at an end of the base section, in the manner of FIG. 4. This method of FIG. 10, which may be employed in any of the embodiments of the invention, has an advantage of resulting in a water-tight seal over an increased level of loosening the plug 84, but a disadvantage of requiring a somewhat more difficult assembly.

The float 66, which is preferably composed of a low-density material, such as a foamed polystyrene resin, is held in place between the upper housing 62 and a rib 90 extending around the lower base section 64. The upper housing 62 is held in place on the base section 64 by means of mating threads 92, with a gasket 94 being compressed to ensure a water-tight connection.

Figure 11:
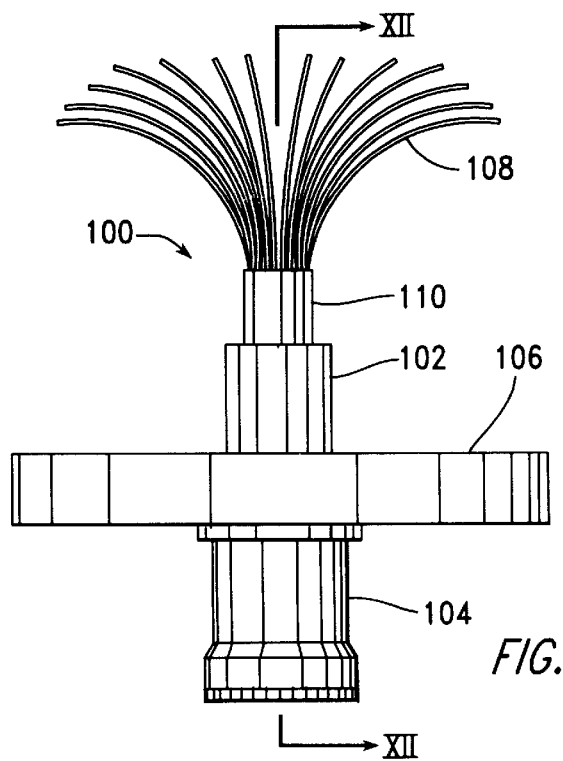
FIG. 11 is a side elevation of a floating light built in accordance with a third embodiment of the invention.

FIG. 11 is a side elevation of a floating light 100 built in accordance with a third embodiment of the invention. This floating light 100 includes an upper housing 102, a lower base section 104 and a float 106. The upper housing 102 includes a number of internally illuminated optical fibers 108, each of which is composed of a transparent glass or plastic material, which are held in place by a framework 110.

FIG. 12 is a vertical cross-sectional view of the floating light 100, taken as indicated by section lines XII—XII in FIG. 11. The floating light 100 includes a battery holder 24 providing electrical light to drive an electric bulb 18, with electrical contact being established through an outer contact terminal 28 and an inner contact terminal 30, as described above in reference to FIG. 4. Also, the battery holder 24 is slidably mounted within a central hole 112 in the lower base section 104, with rotation of a removable plug 114 being used to turn the electric bulb 18 on and off, generally in the manner described above in reference to FIG. 4. As generally described above in reference to FIG. 10, the float 106, which is preferably composed of a low-density material, such as a foamed polystyrene resin, is held in place between the upper housing 102 and a rib 116 extending around the lower base section 104, with the upper housing 102 being fastened to the lower base section 104 by means of mating screw threads 118.

Referring to FIGS. 11 and 12, the floating light 100 preferably also includes a transparent optical element 120, which transmits light from the electric bulb 18 to the proximal ends 122 of the optical fibers 108, with internal reflections in the optical element 120 aiding in the process of transmitting light to the optical fiber. In each of the optical fibers 108, most of the light received at the proximal end 122 is radiated from the distal end 124. In the example of FIG. 12, the proximal ends 122 of the optical fibers 108 lie in a plane, so the adjacent surface of the optical element 120 is flat.

FIG. 13 is a fragmentary vertical cross sectional view of an alternative version of the third embodiment of the invention, having optical fibers 126 with proximal ends at a number of different levels, having an optical element 128 extending upward to these various levels, and having a framework including a number of segments 130, holding the optical fibers 126 in place, supported by attachment to the optical element 128.

FIG. 14 is a fragmentary perspective view of another alternative version of the third embodiment of the invention, having a framework including a section 132 shaped as a part of a plant, such as a leaf, holding a number of optical fibers 134 extending to form points of light along the edges of the framework 132.

FIG. 15 is a fragmentary perspective view of yet another alternative version of the third embodiment of the invention, having a framework including a section 136 with an embedded transparent element 138 which is illuminated by the distal end of an optical fiber 140.

FIG. 16 is a vertical cross-sectional view of a floating light built in accordance with the invention, showing the application therein of a separate power switch 142. The outer contact terminal 144, extending upward from the battery holder 24, makes contact with a terminal 146, which is connected by a first wire 148 to the power switch 142. A conductive path 150 extending to the light source of the floating light is electrically connected to the power switch 142 by a second wire 152, so that the switch 142 can be used to turn the light source off and on. In the example of the drawing, the power switch 142 is a rotary device turned by an external knob 154, having seals to prevent the leakage of water into the switch or into the central hole 156 within the lower housing 158. This kind of control is readily applied to any of the three embodiments discussed above.

A number of versions of the invention include LEDs, which may require resistors for proper operation. Such resistors may be attached to the circuit board 54, 78 of the device, or a resistor may be placed within the battery holder 24 of the device.

While the invention has been described in its preferred forms or embodiments with some degree of particularity, it is understood that this description has been given only by way of example and that numerous changes may be made without departing from the spirit and scope of the invention.

What is claimed is:

1. A floating light, wherein said floating light comprises upper and lower housing sections, an electrically-driven light source, a battery housing, and a removable plug, said upper housing section includes an illuminated portion composed of a material transmitting light;

said lower housing section includes a hollow central portion having an inner opening and an outer opening;

said electrically-driven light source extends through said inner opening of said hollow central portion, said electrically-driven light source includes an illuminating portion extending within said upper housing section to illuminate said illuminated portion of said upper housing section and a base portion extending within said hollow central portion of said lower housing, said base portion includes first and second light source terminals electrically connected to drive said illuminating portion, said battery housing includes a battery structure and first and second contacts extending toward said light source terminals, said battery structure includes first and second battery terminals, a battery voltage is established between said first and second battery terminals, said first contact is electrically connected to said first battery terminal, said second contact is electrically connected to said second battery terminal, said battery housing is slidably mounted to move within said hollow central portion of said lower housing between first and second positions, said first contact is held against said first light source terminal and said second contact is held against said second light source terminal when said battery housing is held in said first position, said first contact is separated from said first light source terminal when said battery housing is held within said second position, said battery housing is additionally removable through said outer opening in said hollow central portion of said lower housing section, said removable plug closes said outer opening in said hollow central portion of said lower housing section and holds said battery housing in said first and second positions, and said floating light floats in water with a portion of said upper housing above a surface of said water and with a portion of said lower housing below said surface of said water.

2. The floating light of claim 1, wherein said floating light additionally comprises a float extending around said lower housing section, said upper housing includes a light-transmitting tube, and said electrically-driven light source includes an electrical conductor extending within said light-transmitting tube and a plurality of light-emitting elements connected to said electrical conductor within said light-transmitting tube.

3. The floating light of claim 1, wherein
said floating light additionally comprises a float extending around said lower housing section, and
said upper housing includes a plurality of light transmitting fibers and framework holding said plurality of light transmitting fibers in place.

4. The floating light of claim 3, wherein said upper housing additionally includes a transparent optical element directing light to proximal ends of said light transmitting fibers.

5. The floating light of claim 1, wherein
said illuminated portion of said upper housing section includes a hemispherical section composed of a material transmitting light, and
said lower housing includes an annular outer portion shaped as a hemisphere.

6. The floating light of claim 5, wherein said electrically-driven light source includes a bulb having a filament.

7. The floating light of claim 6, wherein said electrically-driven light source includes a plurality of light emitting diodes.

8. A floating light comprising:
an upper hemispherical housing section composed of a material transmitting light;
a lower housing section composed of a material reflecting light, wherein said lower housing section includes an annular outer portion shaped as a hemisphere and a central portion extending inward from a center of said outer portion, wherein said central portion includes an outer opening and an inner opening, wherein said lower housing is attached to said upper housing to form a watertight seal between said lower housing and said upper housing;
a removable plug forming a watertight seal with said outer opening;
a battery structure held within said central portion of said lower housing; and
a bulb, connectable to said battery structure to draw electrical power, wherein said bulb is mounted to extend from said central portion of said lower portion through said inner opening into a space between said lower and upper housings.

9. The floating light of claim 8, wherein said upper housing and said annular outer portion of said lower housing have a common spherical radius.

10. The floating light of claim 8, wherein
said floating light has a sufficient displacement to float in water, and
a center of gravity of said floating light is below a center of buoyancy of said floating light.

11. The floating light of claim 8, additionally comprising a pair of contacts electrically connected between said battery and said bulb, wherein
said removable plug is movable in engagement with said outer opening between an outward position and an inward position,
moving said removable plug between said outward position and said inward position closes said pair of contacts to turn said bulb on, and
moving said removable plug between said inward position and said outward position opens said pair of contacts to turn said bulb off.

12. The floating light of claim 8, wherein said upper hemispherical housing section is translucent.

13. The floating light of claim 8, additionally comprising a switch, electrically connected to said bulb, wherein said switch is movable between a closed position allowing a flow of electrical current to said bulb and an open position preventing said flow of electrical current to said bulb.

14. The floating light of claim 8, wherein
said apparatus additionally comprises a battery holder holding said battery structure within said central portion of said lower housing section,
said battery structure includes first and second terminals, with an electrical voltage being established between said first and second terminals,
said battery holder includes a first contact electrically connected to said first terminal of said battery structure and a second contact electrically connected to said second terminal of said battery,
said bulb includes an incandescent filament electrically connected between a central terminal of said bulb and a base of said bulb, and
said battery holder moves with said removable plug between an inward position, in which said first contact is held in contact with said central terminal of said bulb and said second contact is electrically connected to said base of said bulb, establishing an electrical circuit through said battery structure and said filament, and an outward position, in which said electrical circuit is broken.

15. The floating light of claim 14, wherein
said apparatus includes a bulb holder within said central portion of said lower housing section, holding said bulb to extend through said inner opening, and
said battery holder and said bulb holder are removable through said outer opening with said removable plug removed from said outer opening.

16. A floating light comprising:
an upper housing including a light transmitting tube;
a lower housing section including a central hole extending between an outer opening and an inner opening, wherein said lower housing is attached to said upper housing to form a watertight seal between said lower housing and said upper housing around said inner opening;
a battery structure within said central hole of said lower housing section; and
a light source including a base portion extending within said central hole of said lower housing, an electrical conductor extending through said inner opening and within said light-transmitting tube, and a plurality of light-emitting elements connected to said electrical conductor within said light-transmitting tube, wherein said base portion includes circuits electrically connected to said battery structure within said central hole.

17. The floating light of claim 16, additionally comprising a pair of contacts electrically connected between said battery structure and said light-emitting elements, wherein
said removable plug is movable in engagement with said outer opening between an outward position and an inward position,
moving said removable plug between said outward position and said inward position closes said pair of contacts to turn said light-emitting elements on, and
moving said removable plug between said inward position and said outward position opens said pair of contacts to turn said light-emitting elements off.

18. The floating light of claim 16, wherein said apparatus additionally comprises a battery holder holding said battery structure within said central portion of said lower housing section, said battery structure includes first and second terminals, with an electrical voltage being established between said first and second terminals, said battery holder includes a first contact electrically connected to said first terminal of said battery structure and a second contact electrically connected to said second terminal of said battery structure, said battery holder moves with said removable plug between an inward position, in which said first contact is held in contact with a first circuit in said base portion of said light source and said second contact is electrically connected to a second circuit in said base portion of said light source, establishing a flow of electrical current through said light-emitting elements, and an outward position, in which said flow of electrical current through said light-emitting elements is prevented.

19. The floating light of claim 16, additionally comprising a switch, electrically connected to said bulb, wherein said switch is movable between a closed position allowing a flow of electrical current through said light-emitting elements and an open position preventing said flow of electrical current through said light-emitting elements.

20. The floating light of claim 16, additionally comprising a float extending around said lower housing section.

21. The floating light of claim 20, wherein said floating light has a sufficient displacement to float in water, and a center of gravity of said floating light is below a center of buoyancy of said floating light.

22. A floating light comprising:

an upper housing including a plurality of light transmitting fibers and a framework holding said light transmitting fibers in place;

a lower housing section including a central hole extending between an outer opening and an inner opening, wherein said lower housing is attached to said upper housing to form a watertight seal between said lower housing and said upper housing around said inner opening;

a battery structure within said central hole of said lower housing section; and a bulb, connectable to said battery structure to draw electrical power, wherein said bulb is mounted to extend from said central portion of said lower portion through said inner opening into a space between said lower and upper housings.

23. The floating light of claim 22, additionally comprising a float extending around said lower housing section, wherein said floating light has a sufficient displacement to float in water, and a center of gravity of said floating light is below a center of buoyancy of said floating light.

24. The floating light of claim 22, additionally comprising a pair of contacts electrically connected between said battery and said bulb, wherein said removable plug is movable in engagement with said outer opening between an outward position and an inward position, moving said removable plug between said outward position and said inward position closes said pair of contacts to turn said bulb on, and moving said removable plug between said inward position and said outward position opens said pair of contacts to turn said bulb off.

25. The floating light of claim 22, additionally comprising a switch, electrically connected to said bulb, wherein said switch is movable between a closed position allowing a flow of electrical current to said bulb and an open position preventing said flow of electrical current to said bulb.

26. The floating light of claim 22, wherein said apparatus additionally comprises a battery holder holding said battery structure within said central portion of said lower housing section, said battery structure includes first and second terminals, with an electrical voltage being established between said first and second terminals, said battery holder includes a first contact electrically connected to said first terminal of said battery structure and a second contact electrically connected to said second terminal of said battery, said bulb includes an incandescent filament electrically connected between a central terminal of said bulb and a base of said bulb, and said battery holder moves with said removable plug between an inward position, in which said first contact is held in contact with said central terminal of said bulb and said second contact is electrically connected to said base of said bulb, establishing an electrical circuit through said battery structure and said filament, and an outward position, in which said electrical circuit is broken.

27. The floating light of claim 26, wherein said apparatus includes a bulb holder within said central portion of said lower housing section, holding said bulb to extend through said inner opening, and said battery holder and said bulb holder are removable through said outer opening with said removable plug removed from said outer opening.

* * * * *